INVENTORS:
ROBERT H. KOLB
CARL G. LANGNER

June 30, 1970  R. H. KOLB ET AL  3,517,519
ADJUSTABLE VESSEL PIPE RAMP WITH ELASTICALLY
FLEXIBLE HINGE JOINTS Filed Feb. 10, 1969  2 Sheets-Sheet 2

INVENTORS:
ROBERT H. KOLB
CARL G. LANGNER

3,517,519
ADJUSTABLE VESSEL PIPE RAMP WITH ELASTICALLY FLEXIBLE HINGE JOINTS

Robert H. Kolb, Cypress, and Carl G. Langner, Houston, Tex., assignors to Shell Oil Company, New York, N.Y., a corporation of Delaware
Filed Feb. 10, 1969, Ser. No. 797,804
Int. Cl. E02b *1/00;* F16c *7/00*
U.S. Cl. 61—72.3                                                                                    5 Claims

ABSTRACT OF THE DISCLOSURE

An articulated pipe discharge ramp attachable to a pipe laying vessel and constructed of a plurality of elongated ramp segments arranged in end-to-end relationship and interconnected by hinges. Each hinge is comprised of two hinge members, one connected to one segment and the other to an adjacent segment, with the hinge members arranged in spaced relationship to permit limited movement between the members other than about the pivoted axis. A resilient element is carried between the hinge members to yieldably restrain the relative movement between them.

BACKGROUND OF THE INVENTION

This invention relates to a pipe discharge ramp for a pipe-laying vessel and more particularly to an articulated pipe discharge ramp having flexible hinge joints.

With the increased development of oil and gas wells offshore, demand for pipe-laying apparatus to connect underwater facilities or to bring products to shore has increased. Frequently, barges are employed to lay underwater pipelines along the floor of a body of water by assembling pipe lengths on the barge and moving the barge as the assembled pipeline is paid out and laid onto the ocean floor. Also, the pipe lengths may be pre-assembled and wound onto a reel which is then rotatably mounted on the barge.

The pipe employed is generally made of steel and capable of withstanding some bending, but any bending of the assembled pipeline must stay within predetermined limits to avoid kinking or permanently deforming the pipeline which would render it inoperative. As pipeline is laid from a barge the pipe exits the barge and follows a somewhat S-shaped configuration from the barge deck to the ocean floor. In relatively shallow waters, the vertical descent of the unsupported pipeline, being small, results in a large radius of curvature of the pipeline as it comes off the barge, and the pipe remains safe from bending damage. However, as the water depth increases, the length of unsupported pipeline increases causing the pipeline to sag under its own weight. Thus, the radius of curvature of the pipeline as it leaves the barge becomes smaller and the bending moments imposed on the pipeline may well exceed the allowable limits and result in permanent deformation or kinking of the pipeline.

Several attempts have been made to improve the design of the pipe discharge ramp or so-called "stinger" to alleviate severe bending moments in the pipeline as it leaves the barge. These devices have typically been rather large, rigid assemblies often used in conjunction with floatation means to force the pipeline to assume a curvature whose minimum radius is great enough to avoid undue bending. More recently a pipe discharge ramp has been developed which is comprised of a series of pivotally connected buoyant segments extending away from the barge and pivotal in the vertical plane. The resultant structure provides an articulated discharge ramp whose buoyancy can be adjusted to vary the radius of curvature of the ramp and hence the radius of curvature of the pipeline as it leaves the barge. Articulated adjustable pipe discharge ramps of this type are disclosed in U.S. patent application Ser. No. 600,196, filed Dec. 8, 1966, and now Pat. No. 3,438,213 and in U.S. application Ser. No. 637,674, filed May 11, 1967 and now Pat. No. 3,472,035. In these applications the pipe discharge ramp is adapted to be pivoted or adjusted in the vertical plane by providing hinge means between the discharge ramp segments which have a horizontal pivot axis.

In actual practice, however, the pipeline, as it leaves the barge and acts against the ramp, exerts more than just a vertical component of forces against the ramp. If the barge deviates slightly from its course or if lateral currents are present which act against the pipeline as it is being laid, the pipeline will attempt to move laterally off of the pipe discharge ramp but since it is held by rollers forming a substantially V-shaped trough, the pipeline will exert a sideways or lateral force against the remote end of the discharge ramp which would be translated into a sideways bending moment at the hinges. In addition, the rolling motion of the vessel may introduce a twisting or torsional force in the pipe discharge ramp. These forces, acting on a substantially rigid structure, could well reach a magnitude that would damage the pipe discharge ramp thereby causing a cessation in the pipe-laying operation and downtime to repair the ramp or even replace it entirely.

Accordingly, there exists a need for an articulated adjustable pipe discharge ramp which will accommodate the operating conditions encountered during actual pipe-laying conditions without causing damage to the ramp and it is to this end that the subject invention is directed.

SUMMARY OF THE INVENTION

In view of the above-mentioned shortcomings in existing offshore pipe-laying apparatus it is a primary object of this invention to provide an articulated segmented pipe discharge ramp for a pipe-laying barge which will withstand the lateral and torsional bending moments imposed by current drag forces and wave induced vessel motions during pipe-laying operations without damaging the pipe discharge ramp.

Another object is to provide an articulated segmented pipe discharge ramp which is adjustably pivotal in a vertical plane by providing flexible hinge means between the ramp segments.

Still another object of the invention is to provide a segmented pipe discharge ramp having hinge means that permit limited pivoting between the ramp segments about a substantially vertical axis without damage to the ramp structure.

A still further object is to provide a segmented pipe discharge ramp in which the hinge means allow limited non-destructive twisting between the ramp segments.

Yet another object is to provide a pipe discharge ramp having flexible hinge means at the point the ramp is attached to the pipe-laying barge.

These objects and others which will become apparent upon further reading of the specification are met by providing a pipe discharge ramp for a pipe-laying barge of the type in which a series of pipe supporting segments are connected in end-to-end relationship extending from the stern of a pipe-laying barge, each of the segments being interconnected by means of one or more flexible hinges. Each hinge provides free pivoting about a substantially horizontal axis so that the segments can be readily adjusted to a curvature when viewed from the side which approximates the desired curvature of the pipe being laid. The hinge means include two cooperating hinge parts, one of which is connected to one ramp segment and the other to an adjacent ramp segment.

In order to provide flexibility in the hinge a resilient element, for example, a block of elastomeric material, is interposed between the hinge parts so that the hinge, in addition to its usual movement about a substantially horizontal axis, will also permit limited movement about a vertical axis and/or a twisting motion between the ramp segments.

DESCRIPTION OF THE PREFERRED EMBODIMENT

Figure 1:
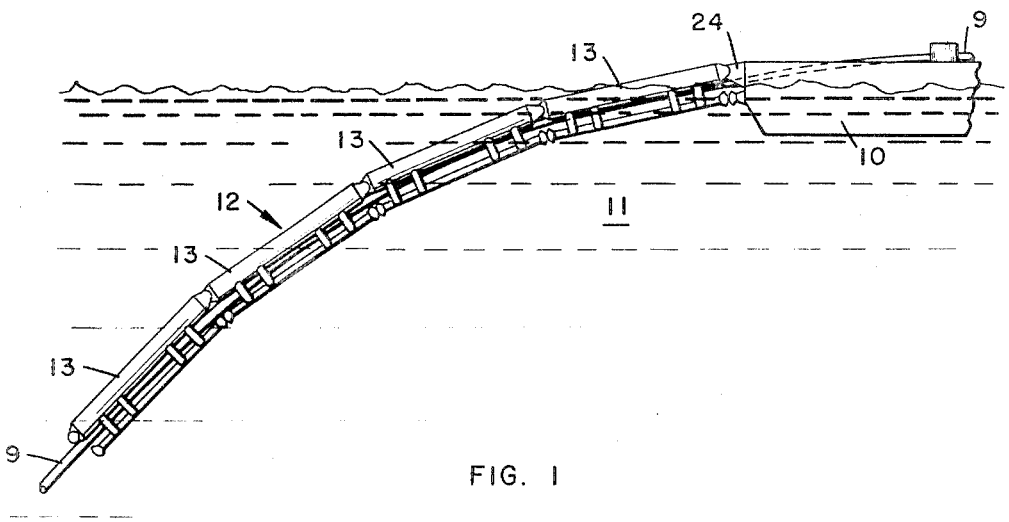
FIG. 1 is an elevational view of an articulated segmented pipe discharge ramp attached to a pipe-laying barge of the type to which the subject invention may be adapted.

Referring now to FIG. 1, a pipe laying barge 10 is shown positioned on the surface of a body of water 11. The barge may be of any suitable type known in the art adapted for laying a continuous pipeline 9 along the floor of a body of water. For example, the barge may be of a type in which pipe sections are joined by welding on the deck of the barge or it may be a reel-type barge in which a spool or reel wound with assembled pipe lengths is rotatably mounted on the deck of the barge so that as the barge is moved the reel unwinds thereby paying out the pipeline.

An articulated pipe discharge ramp indicated generally by the numeral 12 is attached to the barge 10 at the point 24 where the pipeline 9 leaves the barge. The ramp 12 is comprised of a plurality of ramp segments 13 connected in end-to-end pivotal relationship.

Figure 2:
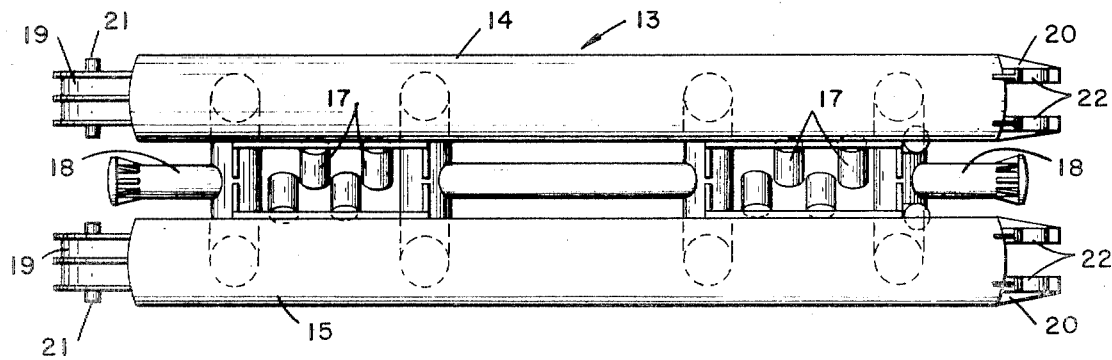
FIG. 2 is a plan view of one of the segments of the pipe discharge ramp.
Figure 3:
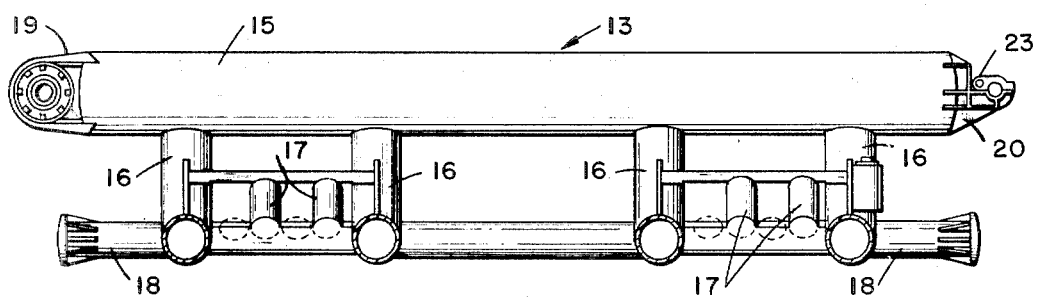
FIG. 3 is an elevational view of one of the segments of the pipe discharge ramp.

An individual ramp segment is illustrated in FIGS. 2 and 3. Each ramp segment 13 is made up of tubular pontoons 14 and 15 connected by cross members 16, and carries suitable rollers 17 arranged in the form of a V to support the pipeline 9. Stop means 18 are attached to the end of each ramp segment 13 to limit the minimum radius of curvature that can be assumed by the ramp 12 as shown in FIG. 1.

The tubular pontoons 14 and 15 each have attached to one end thereof a male hinge part 19 and to the other end a female hinge part 20. The hinge parts include a hinge pin 21 adapted to be pivotally carried in a saddle portion 22 of the female hinge part 20. Bearing caps 23 are employed to restrain the pin 21 in the saddle portion 22. Thus, it will be seen that when the segments 13 are connected end-to-end each segment is free to at least partially rotate about the hinge pin 21 relative to an adjacent segment. The segment closest to the barge 10 is pivotally connected to the barge by means of a mating hinge part 24 secured to the barge 10.

The radius of curvature of the ramp 12, when in use, is varied by adjusting the angularity or extent of articulation between the segments 13. The segments may be selectively pivoted by mechanical means or the buoyancy of each segment may be controlled by selectively flooding or evacuating the hollow members 14 and 15 as described in the aforementioned patent application Ser. No. 600,196, filed Dec. 8, 1966.

FIGS. 4–7 disclose in greater detail the hinge parts which interconnect the ramp segments 13. Each figure discloses a different embodiment of the elastomeric element employed between the hinge parts to permit limited relative torsional movement and/or limited relative movement about a vertical axis as between the ramp segments 13.

Figure 4:
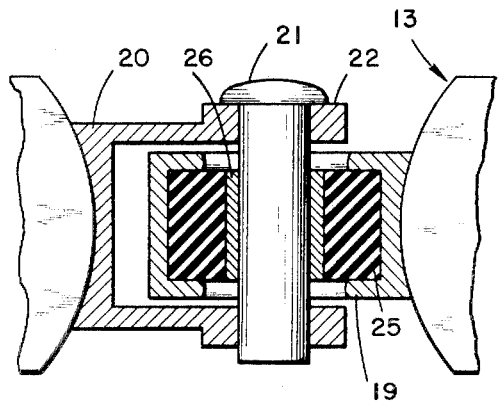
FIG. 4 is a cross-sectional view of the hinge used to interconnect the ramp segments incorporating the subject invention.

In FIG. 4 the male hinge part 19 is provided with an elastomeric "bushing" indicated generally by the numeral 25. In the FIG. 4 embodiment the bushing 25 is comprised of a single elastomeric material such as rubber. The bushing may be bonded to the pin 21, in which case relative rotation of the hinge parts occurs between the pin 21 and the saddle portions 22 of the female hinge part 20. Otherwise the bushing may be unbonded, so that relative rotation of the hinge parts occurs directly between the hinge pin 21 and the bushing 25. Otherwise the bushing may be bonded to a metal sleeve 26 into which the hinge pin fits. In this embodiment relative rotation of the hinge parts occurs between the hinge pin 21 and the metal sleeve 26.

The bushing 25, being interposed between the hinge pin 21 and the housing of the male hinge part 19, provides limited translational flexibility between the hinge parts 19 and 20. The flexibility provided by each pair of bushings, as shown in FIG. 2, when two segments are connected end to end, permits limited torsional movement and limited rotational movement about a vertical axis between the two segments, in addition to the rotational movement about a horizontal axis which is permitted by the hinge alone.

A desirable feature of such an elastically flexible hinge is the non-linear deflection characteristic which allows it to become progressively stiffer as it is deflected from its no-load position. The deflection characteristics of a flexible hinge are dependent on the size, shape, containment and hardness of the elastomeric elements.

Figure 5:
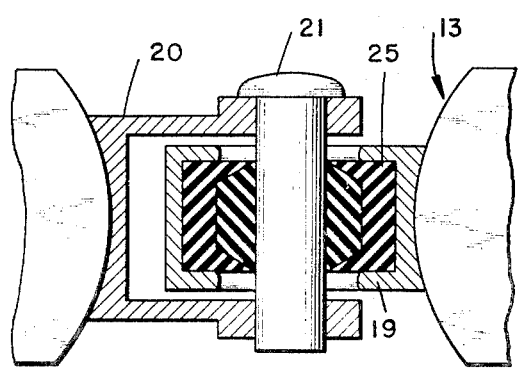
FIGS. 5–7 are cross-sectional views of modified forms of the hinge in accordance with the invention.

FIG. 5 shows another embodiment of the elastomeric "bushing." Two elastomeric materials are bonded together to form a composite bushing 25, whose function is similar to the function of the simple bushing as discussed above with reference to FIG. 4. The inner elastomeric material is preferably of higher density than the outer elastomeric material, as this arrangement provides the most desirable deflection characteristics. Obviously the embodiment which includes a combination of two elastomeric materials could be extended to include three or more elastomeric materials, positioned either concentrically or juxtaposed.

Figure 6:
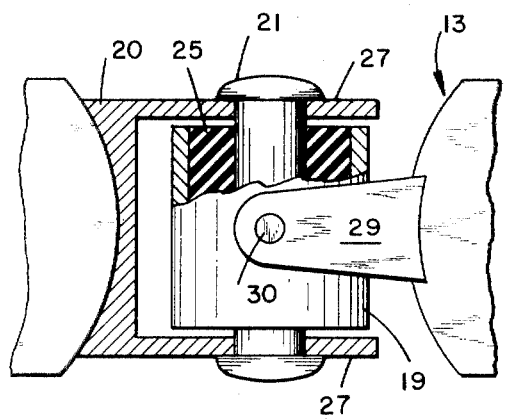
Figure 7:
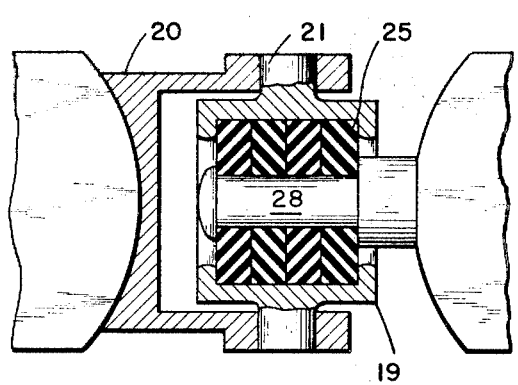

FIGS. 6 and 7 show other embodiments of the elastomeric elements which might be used in the flexible hinge. In the FIG. 6 embodiment the bushing 25 is laterally confined by the sides 27 of the female hinge part 20. Such confinement might provide longer service life for the bushing. In this embodiment the right hand segment 13 is attached to cylindrical bushing housing 19 by means of a yoke 29. The yoke 29 is pivoted to the housing 19 at 30. However, the yoke does not freely pivot relative to the housing since each segment 13 is attached to an adjacent segment by means of a pair of spaced hinge assemblies as shown in FIGS. 2 and 3. The purpose of pivoting yoke 29 to housing 19 is to compensate for angular misalignment between the hinge parts when the ramp 12 is subjected to sideways forces. The arrangement results in more even loading of the bushing 25. In the FIG. 7 embodiment the bushing 25 consists of a series of elastomeric washers bonded to a longitudinal plunger 28. Longitudinal movements of the plunger are accompanied by a pure shearing of the washers rather than by a combined compression and shearing of an elastomeric bushing as occurs in the other embodiments described above.

When equipped with elastically flexible hinge joints such as described above, a pipe discharge ramp attached to an oscillating vessel or barge is no longer constrained to transmit the motions of the vessel throughout its length but rather is capable of absorbing these motions and elastic deflections in the first few segments; leaving the more distant portions of the stinger relatively undisturbed. Furthermore, if the vessel is inadvertently turned out of alignment with the pipeline descending from its stern, the stinger is free to assume a curved position accommodating this misalignment without creating excessive stresses in either the ramp or the pipeline.

Many of the benefits described could be obtained by providing joints that are freely gimbaled and/or rotatable rather than elastically flexible as disclosed. However, an elastically flexible hinge provides a restoring force that is proportional to its deflection from the no-load position. This flexible stiffness in a lateral or horizontal plane has several advantages over a freely gimbaled joint. A freely gimbaled segmented pipe discharged ramp would be so unconstrained as to create a difficult handling problem, for example, whenever there was no pipeline in place within it to align the various segments.

Scale model studies have been conducted and show that a pipe discharge ramp with flexible joints as disclosed would offer a considerable advantage in practice over conventional stiff pipe discharge ramps which do not permit any sideways deflection.

Although only elastomeric (rubber) elements have been disclosed to provide flexibility in the hinge, it will be apparent that other yieldable means to provide limited movement may be employed. For example, a metal spring or hydraulic means could be substituted. It will be apparent to one skilled in the art that modifications of the flexible joint disclosed in this application may be employed without departing from the spirit of the invention or the scope of the appended claims.

We claim as our invention:

1. An articulated pipe discharge ramp attachable to a pipe laying vessel for guiding a pipe being laid from said barge, said pipe discharge ramp comprising:
   a plurality of elongated interconnected ramp segments arranged in end-to-end relationship;
   hinge means itnerconnecting at least a pair of said segments to permit said segments to be pivoted in a vertical plane, said hinge means including
      a first hinge member carried by an end of one of said segments;
      a second hinge member carried by an end of an adjacent element and cooperable with said first member for pivotal movement therebetween;
      said hinge members being connected together in spaced relationship to permit limited movement between said hinge members other than about the pivotal axis; and,
      resilient movement-limiting means carried by at least one of said hinge members to yieldably restrain movement between said hinge members other than about the pivotal axis.

2. The apparatus as defined in claim 1 wherein one of said ramps is pivotally connected to said vessel to permit pivoting in a vertical plane.

3. The apparatus as defined in claim 2 wherein said pivotal connection of said ramp to said vessel includes a vessel hinge member cooperable with the hinge member carried by the pipe guide segment closest to said vessel, said vessel hinge member and said hinge member carried by said pipe guide segment closest to said vessel being connected together in spaced relationship to permit limited movement therebetween other than about the pivotal axis; and,
   resilient movement limiting means carried between said vessel hinge member and said hinge member carried by said pipe segment closest to said vessel to yieldably restrain movement between said hinge members other than about the pivotal axis.

4. The apparatus as defined in claim 1 wherein said yieldable movement limiting means comprises at least one elastomeric element.

5. The apparatus as defined in claim 1 wherein said yieldable movement limiting means comprises a plurality of elastomeric elements at least one of which has a density greater than the remaining elements.

References Cited

UNITED STATES PATENTS 3,438,213   4/1969   Broussard et al.

FOREIGN PATENTS 625,728   9/1961   Italy.

JACOB SHAPIRO, Primary Examiner

U.S. Cl. X.R.

287—92